з,058,885
Patented Oct. 16, 1962

3,058,885
PROCESS FOR TREATMENT OF INSULIN CRYSTALS AND FOR PRODUCTION OF INSULIN PREPARATIONS THEREFROM
Jorgen Schlichtkrull, Bronshoj, Denmark, assignor to Novo Terapeutisk Laboratorium A/S, Copenhagen, Denmark
No Drawing. Filed May 27, 1958, Ser. No. 738,011
Claims priority, application Denmark June 8, 1957
9 Claims. (Cl. 167—75)

It is known that crystalline insulin is produced by adding a buffering substance to an aqueous insulin solution containing one or more of the metal ions prerequisite to the crystallization of the insulin, such as zinc, cadmium, cobalt, nickel and copper, preferably zinc, and adjusting the pH-value to 5.5 to 6.5. In order to avoid a temporary precipitation of insulin in amorphous state during the crystallization organic solvents, such as acetone, may be added, which will prevent precipitation of amorphous insulin but not of the crystals.

As buffering substances use has been made of alkali phosphates which, however, have the disadvantage of precipitating a part of the zinc ions in the form of a very slightly soluble zinc phosphate polluting the crystals. In subsequent recrystallization of the insulin precipitate from a solution which has been buffered with ammonium acetate it is possible to get rid of the zinc phosphate pollution and the crystals thus produced are found to contain 0.52% of zinc, which, incidentally, corresponds to 3 atoms of zinc in the rhombohedral unit cell of the crystals. As buffering substance use may also be made of borate-, diethylbarbiturate- or maleate buffer which are not precipitated or in other way bind the zinc ions of the solution. When this kind of buffer substances is used one must only take care that there is not so much zinc or the like metal ions present that the insulin when being bound to the metal is rendered slightly soluble and is hindered in crystallizing. A buffer being specially adequate is sodium citrate which binds the zinc ions in a strongly complex compound having just such strength that the amount of zinc prerequisite to the crystallization of the insulin (0.35% or 2 atoms of zinc per unit cell) is bound to the insulin. The insulin crystals produced with citrate buffer thus contain 0.35% of zinc or an equimolar amount of the other crystallization-promoting metals (Cd, Co, Ni, etc.).

The crystallization of insulin may be a step in the aseptic production of pharmaceutical insulin preparations, viz. the so-called insulin-zinc-suspensions being sterile zinc-containing suspensions of insulin crystals and possessing a prolonged insulin action. In such case no isolation of the crystals from the mother liquor will usually be performed, but the crystal suspension will be diluted in an appropriate way so as to get the desired composition of the final preparation. In all other cases the insulin crystals appear as an intermediate product in the manufacture, for which reason they are isolated, if desired washed and dried so that they only contain 2–8% of water. The contents of zinc and the like metals in the insulin crystals, as mentioned above and below, have thus been calculated on the weight of dried crystals. The undried crystals are estimated to contain about 60% of solid matter.

If the insulin crystals produced according to the above mentioned crystallization methods are suspended in distilled water, and the suspension is injected subcutaneously, an insulin action will be obtained which will not be substantially different from the brief action of dissolved insulin.

During many years the opinion was prevailing that in order to obtain a prolonged insulin action of practical importance it was necessary to inject the insulin together with auxiliary substances being foreign to the human body, such as protamine, globin, surfen etc. having the effect of delaying the resorption of the insulin.

Later one realized that the employment of such foreign substances is not necessary. Thus, it is possible to obtain a prolonged insulin action by means of aqueous insulin crystal suspensions which have been given such composition that if the suspension medium is adjusted to pH 7 the suspended insulin crystals will show a particularly high content of the above mentioned metals of above 0.25 milliequivalent per gram, preferably at least 0.35 milliequivalent per gram, whereby the crystals will remain practically undissolved at this pH.

The present invention concerns a process for treatment of insulin crystals by which it is possible to impart to the crystals such properties that on parenteral injection after suspension in an aqueous medium they will give a prolonged insulin action without the necessity of giving the aqueous medium beforehand a certain minimum content of the crystallization-promoting metals and such composition that the crystals will take up metal from the medium at neutral reaction or without the necessity of giving the insulin crystals beforehand an increased metal content.

The process according to the invention is characterized in that crystals which have entirely or partly been produced from bovine pancreas glands are subjected to a thermal treatment at such a temperature and during such period of time that after suspension in an aqueous injectable medium and subsequent subcutaneous injection the crystals will show an insulin action which is prolonged compared to the action of untreated crystals under the same conditions.

The prolonged insulin action will be the more prolonged the higher the temperature is and the longer the period of time has been. If as starting material use is made of ox insulin crystals, an extraordinarily prolonged insulin action may be obtained when storing the crystals at 20° C. during about one year or by storing them at 45° C. during 3 weeks, or at 70° C. during 24 hours. According to the invention it is preferred to subject the crystals to a temperature above room temperature, suitably at 40–70° C. Temperatures above about 70° C. will normally be inappropiate as then the crystals will tend to stick together while the employment of temperatures below about 40° C. requires a period of time which is inappropriately long for practical manufacture. Any desired degree of prolongation of the insulin action can easily be obtained by variation of temperature and time of the thermal action. When mixing suspensions having different actions it is possible to obtain an infinite number of different combination actions.

It is appropriate that the thermal treatment of the crystals according to the invention takes place while the crystals are in suspension e.g. as they are obtained by a crystallization. In this state the crystals contain, as mentioned above, about 60% of solid matter. The effect of the thermal treatment is weakened when the water content of the crystals is decreased. If during the thermal treatment the water content of the crystals is about 20% it is estimated that it will be necessary to use twice the time in treating the crystals in order to obtain the same protracted effect as by treating non-dried crystals, conditions otherwise being identical. Ordinary crystalline dry insulin containing about 2–8% of water will practically not be influenced by the thermal treatment.

According to the invention it has been found that the pH-value of the medium with which the crystals are or have been in balance has a decisive influence on the therapeutic effect of the thermal action. Thus tests have shown that the prolonged action of the treated crystals will be the longer, the lower this pH-value within the interval of 5–8 is. If the pH-value is in the neighborhood of the pH of the blood (7.4) the thermal action will practically have no effect. Consequently, in the production of crystals having a slow action, according to the invention a pH-value is used being less than 7, e.g. 5, 5.5 or 6.

As suspension medium for the crystals when these are subjected to the thermal treatment the mother liquor from the crystallization may e.g. be used. Other media may also be employed provided that, when making use of the current knowledge about insulin, one takes care that the crystals do not go into solution in the medium, which, moreover, may not contain substances which are detrimental to the biological activity of the insulin. In order to fix the pH-value of the medium it is appropriate to make use of a buffering substance, examples of which are mentioned in the following. It may be mentioned that buffering substances, such as citrate, which when bound to the zinc ions may abolish the prolonged action of the crystalline insulin-zinc-suspensions, do not hinder the effect of the thermal treatment. The medium may also contain solvents which are miscible with water, such as acetone, which will just happen when it is e.g. the mother liquor from a crystallization according to the citrate method. In practice it is most appropriate that the medium in which the thermal action takes place has such a composition that it is suitable for injection purposes.

In such case it is possible by a suitable dilution etc. and by adjusting the pH-value to 7 to convert the suspension into an insulin preparation ready for use, when working under sterile conditions.

The insulin crystals produced according to the invention do not differ from the crystals as they are before the thermal treatment, neither in appearance, nor in the amino acid composition, but they have a somewhat lower solubility in a hydrochloric acid solution of sodium chloride and in a neutral phosphate buffer. The crystallization ability of the insulin is decreased during the thermal treatment which may easily be ascertained by recrystallizing the treated crystals.

When carrying out the process according to the invention use may be made of insulin crystals produced by means of any crystallization method. Particularly applicable is a special crystallization method mentioned in Danish Patent No. 78,069.

In view of the therapeutical application it is appropriate that the crystals are not too big. In order to avoid sedimentation in the ampoules the crystal size should not exceed 40μ. The biological activity of the crystal suspensions is somewhat dependent on the crystal size as the prolongation of the activity increases with increasing crystal size. Consequently, it is appropriate that the crystals are produced with the same size distribution from one crystal charge to the other.

The process according to the invention may also be applied to insulin crystals having a particularly high metal content (above 0.25 milliequivalent per gram) as these thereby may be given a more protracted effect in aqueous suspension than without the thermal treatment according to the invention.

The invention also concerns a process for the production of insulin preparations with protracted effect, the said process being of the kind in which sterile insulin crystals are suspended under sterile conditions in a sterile aqueous medium appropriate for injection purposes, and the characteristic feature of this process consists in that use is made of the insulin crystals produced according to the invention, and in that the aqueous medium has or is given a pH-value of about 7 (6.5–7.5). As appears from the above, such neutral preparations are completely stable even when stored for a long period of time, due to the fact that the aqueous medium has a pH-value of about 7.

If in the preparations no use is made of auxiliary substances, now being superfluous, such as protamine, zinc etc., they are miscible with ordinary quick-acting insulin solutions while maintaining the quick action of the ordinary insulin and the prolonged action of the crystals. It is even possible in the production of the preparations to give them a content of dissolved quick-acting insulin in order to obtain a strong initial effect. In such case use may in the dissolved fraction be made of swine insulin which has a relatively high solubility at neutral reaction. Finally, composite preparations may be produced containing crystals having several different breadths of activity so that there is practically an unlimited number of possibilities of obtaining appropriate polyphasic actions. Thus, the new discovery and the production methods developed according to the invention do not only represent a novel manner in which to obtain a prolonged insulin action but has formed the base of an insulin therapy which is more flexible and can be individualized to a much larger extent than has previously been possible and, what is worth remembering, without the use of auxiliary substances.

Nothing prevents from giving the said suspensions a content, e.g. of zinc ions, whereby a still more prolonged insulin action may be obtained, but this is not necessary as within the scope of the invention it is possible to arrive at insulin crystal suspensions having an even more prolonged insulin action than has previously been obtainable with the hitherto known insulin crystals in suspensions containing zinc in concentrations being applicable for therapeutic purposes.

The below working examples serve to further illustrate the processes according to the invention.

In the following examples use has been made of a stock suspension ($S_1$) having the below composition:

40 units per millilitre of insulin crystals from ox pancreas glands,
1.4 mgs. of $Zn^{++}$ per 100 millilitres (as chloride),
0.01 M sodium acetate,
0.7% of NaCl,
0.1% of methyl-p-hydroxy benzoate, and
HCl till pH=5.5.

The suspension is produced by diluting 1 volume of concentrated crystal suspension with 9 volumes of methyl-p-hydroxy-benzoate solution containing 0.11% of methyl-p-hydroxy benzoate. The concentrated crystal suspension is produced by mixing the below solutions A and B, and subsequent agitation while the insulin crystallizes:

A. 3.48 grams of ox insulin crystals containing 0.78% of Zn are suspended in 100 millilitres of water and dissolved by adding 4 millilitres of 1 N HCl. The solution is sterile-filtered and diluted till 150 millilitres.

B. $\frac{1}{50}$ mole of sodium acetate and 14 grams of NaCl are dissolved in water till 50 millilitres containing so much NaOH that the mixture of A plus B gets pH=5.5.

*Example 1*

Suspension $S_1$ is stored at 45° C. during 2 weeks. By injection in rabbits a protracted effect will appear resembling that of the zinc-protamine-insulin. The crystals are sucked off and dried.

*Example 2*

The dried crystals from the foregoing example are suspended in a sterile injectable medium having the same composition as that in which the crystals received the thermal action. After suspending of the crystals the pH-value is adjusted to 7.0 with 1 N NaOH. The preparation has almost the same effect as zinc-protamine-insulin. The prolonged action of the preparation does not change under the usual storing conditions for insulin preparations.

*Example 3*

Suspension $S_1$ is stored at 45° C. during 4 weeks. Hereby the activity of the crystals becomes so protracted that after subsequent injection of the suspension in rabbits hardly any action will be observed during the first 8 hours after the injection. The biological activity of the insulin is on the contrary intact, which may be ascertained by dissolving the crystals in hydrochloric acid and perform a usual biological potency determination.

*Example 4*

To suspension $S_1$ are added 1.8 milligrams of $Zn^{++}$ per 1000 units in the form of zinc chloride, and pH is adjusted to 5.0 with 1 N HCl without the volume being substantially increased. After standing during 1 year at 20° C. the protracted effect of the suspension is enormous and it has a much slower action than zinc-protamine-insulin.

*Example 5*

To suspension $S_1$ sodium phosphate and hydrochloric acid are added without the volume being substantially increased, so that the suspension becomes 0.01 M as far as phosphate is concerned and gets pH=5. After standing during 2 weeks at 45° C. the crystals have obtained a highly protracted activity and may be isolated and dried, if desired.

*Example 6*

To suspension $S_1$ 1 N HCl is added till pH=5.0. After standing during 7 hours at 70° C. the crystals have changed so much that the suspension has obtained a highly protracted activity.

*Example 7*

A crystallization mixture having the following composition is produced:

0.8% of ox insulin,
0.040% of $Zn^{++}$ (as chloride),
0.05 M sodium citrate,
15% of acetone, and
HCl till pH=6.0.

The crystallization takes place while stirring for some hours whereafter the acetone is evaporated under continued stirring for 24 hours at 45° C. Then the suspension is diluted with a solution of sodium chloride and methyl-p-hydroxy benzoate whereby it obtains the following composition:

40 units of insulin crystals per millilitre,
97 gamma of $Zn^{++}$ per millilitre,
0.01 M sodium citrate,
0.7% of NaCl,
0.1% of methyl-p-hydroxy benzoate, whereafter pH is adjusted to 5.5 with 1 N HCl. After storing during 2 weeks at 45° C. the suspension will show a highly protracted insulin action, and the crystals are separated.

*Example 8*

A crystallization is made as in the preceding example, but the crystals are sucked off, washed with 60% acetone and dried before the thermal treatment. The dried crystals are suspended in a suspension medium so that a suspension of the same chemical composition as $S_1$ is obtained. After standing during 2 weeks at 45° C. the suspension shows a highly protracted action and the crystals are separated, or the suspension is adjusted to pH 7, whereby an insulin preparation having a protracted effect is direct obtained.

*Example 9*

A suspension ($S_2$) is produced, the procedure being that described re $S_1$ with the exception that the addition of NaCl is omitted. After standing during 2 weeks $S_2$ appears to possess a highly protracted insulin action.

*Example 10*

A crystallization as described re $S_1$ is performed, but instead of diluting the crystal suspension the crystals are separated and dried. Then the dried crystals are suspended in an aqueous medium so that a suspension having the same chemical composition as $S_1$ is obtained. After standing during 2 weeks at 45° C. the suspension will show a highly protracted effect, and the crystals may then be separated.

In the above examples use has been made of zinc insulin crystals. The process according to the invention may, however, also be applied to insulin crystals containing other metals, such as cobalt, cadmium, nickel or copper. In order to illustrate this, reference may be made to the below example in which use has been made of copper insulin crystals.

*Example 11*

A crystallization mixture having the following composition is produced:

0.8% of zinc-free ox insulin,
0.040% of $Cu^{++}$ (as chloride),
0.05 M sodium citrate,
15% of acetone, and
HCl till pH=6.0.

The crystallization takes place while stirring until the following day whereafter the acetone is evaporated and the suspension is diluted as described in Example 7. Hereby the suspension gets the following composition:

40 units of insulin crystals per millilitre,
87 gamma $Cu^{++}$ per millilitre,
0.01 M sodium citrate,
0.7% of NaCl,
0.1% of methyl-p-hydroxy benzoate, whereafter pH is adjusted to 5.5 with 1 N HCl. After standing during 2 weeks at 45° C. the suspension will show a highly protracted insulin action.

Instead of subjecting the insulin crystals to the thermal treatment in suspension the crystals may as such be subjected to the treatment while taking care that the crystals are not dried out during the treatment. This may take place by storing the separated crystals in a container e.g. an exsiccator in which e.g. by means of an aqueous saline solution such a steam pressure is maintained that the water content of the crystals is kept constant for instance in the interval from 20 to 40%.

When carrying out the process according to the invention one may e.g. proceed as follows:

*Example 12*

Crystals from suspension $S_1$ are sucked off and weighed on a tared glass filter whereafter they are placed in vacuo (1–2 mm. Hg) in an exsiccator containing a 5 percent sodium chloride solution. After 3 days at room temperature equilibrium is reached, and the exsiccator is held at 45° C. during 2 weeks. Thereby the equilibrium is only slightly changed, and the crystals prove to contain about 20% of water. The crystals are suspended in a suspension medium so that the suspension will have the same composition as $S_1$. The suspension shows a somewhat prolonged action.

Having thus fully described my invention I claim as new and desire to secure by Letters Patent:

1. A process of treating insulin crystals to alter their biological activity, which comprises heating insulin crystals having a crystallization-promoting metal content of at least about 0.1 milliequivalent per gram and produced from bovine pancreas glands and having a water content of above 8% at a temperature above room temperature and maintaining the water content in the crystals above 8% while heating, to produce crystals which when suspended in an aqueous injectable medium and subcutaneously injected exhibit a substantially protracted insulin action compared with the action of the original crystals under like conditions, said crystals remaining in crystal form during said heating.

2. A process as defined in claim 1, wherein said metal is zinc.

3. A process as defined in claim 1, wherein said temperature is at least 40° C.

4. A process of treating insulin crystals which comprises forming a suspension of insulin crystals having a crystallization-promoting metal content of at least about 0.1 milliequivalent per gram and produced from bovine pancreas glands in an aqueous medium having a pH-value below 7, heating the resultant suspension at a temperature above room temperature to produce crystals which when separated from said suspension and suspended in an aqueous injectable medium and subcutaneously injected exhibit a substantially protracted insulin action compared with the action of the original crystals under like conditions, said crystals remaining in crystal form during said heating.

5. A process as defined in claim 4, wherein said suspension is heated to a maximum temperature of about 70° C.

6. A process as defined in claim 4, wherein said metal is zinc.

7. An injectable insulin preparation having a protracted action which comprises a suspension in an injectable aqueous medium having a pH-value of about 7 of insulin crystals having a crystallization-promoting metal content of at least about 0.1 milliequivalent per gram and produced from bovine pancreas glands, said insulin crystals being substantially insoluble in said medium and said insulin crystals having been heated to a temperature above room temperature while having a water content above 8%, whereby said crystals in said aqueous injectable medium exhibit a substantially protracted insulin action when subcutaneously injected compared with the action of the original crystals under like conditions, said crystals remaining in crystal form during said heating.

8. A preparation as defined in claim 7, wherein said metal is zinc.

9. A process of producing insulin preparations having a protracted action which comprises forming a suspension of insulin crystals having a crystallization-promoting metal content of at least about 0.1 milliequivalent per gram and produced from bovine pancreas glands in an injectable aqueous medium having a pH-value below 7 and wherein the insulin crystals are substantially insoluble, heating the resultant suspension at a temperature above room temperature to produce crystals which when separated from said suspension and suspended in an aqueous injectable medium and subcutaneously injected exhibit a substantially protracted insulin action compared with the action of the original crystals under like conditions, and adjusting the pH of the aqueous medium to 7, said crystals remaining in crystal form during said heating.

References Cited in the file of this patent

UNITED STATES PATENTS 2,704,737    Bischoff _____ Mar. 22, 1955

OTHER REFERENCES

Waugh: J.A.C.S. 68, 247–250, February 1956.
Waugh: J. Biol. Chem. 185: 1, pages 85–95, July 1950.
Waugh: Advances in Protein Chemistry, pp. 424–425 of vol. IX, 1954, Academic Press, N.Y., 1954.
Romans: Ind. and Eng. Chemistry, vol. 32, No. 7, July 1940, pages 908–910.
Sahyun: J. Biol. Chem., April 1941, pages 487–490